United States Patent
Zinn

(10) Patent No.: US 10,357,943 B2
(45) Date of Patent: Jul. 23, 2019

(54) ARTICLES HAVING AN EXPOSED SURFACE COATING FORMED FROM COPPER NANOPARTICLES

(71) Applicant: LOCKHEED MARTIN CORPORATION, Bethesda, MD (US)

(72) Inventor: Alfred A. Zinn, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 396 days.

(21) Appl. No.: 14/992,960

(22) Filed: Jan. 11, 2016

(65) Prior Publication Data

US 2016/0201183 A1    Jul. 14, 2016

Related U.S. Application Data

(60) Provisional application No. 62/103,505, filed on Jan. 14, 2015.

(51) Int. Cl.
   *B32B 3/00* (2006.01)
   *B32B 15/01* (2006.01)
   *C23C 24/10* (2006.01)

(52) U.S. Cl.
   CPC ............ *B32B 15/01* (2013.01); *C23C 24/106* (2013.01)

(58) Field of Classification Search
   None
   See application file for complete search history.

(56) References Cited

U.S. PATENT DOCUMENTS 4,732,731 A * 3/1988 Asai .......................... C22C 9/02
                                                      148/433
5,077,005 A * 12/1991 Kato ......................... C22C 9/00
                                                      420/469

(Continued)

FOREIGN PATENT DOCUMENTS

CN           101543228 B       1/2012

OTHER PUBLICATIONS

J. Kolmas, et al., "Substituted Hydroxyapatites with Antibacterial Properties," Biomed. Res. Int., May 11, 2014, 178123 (14 pp.).

(Continued)

*Primary Examiner* — Adam Krupicka
(74) *Attorney, Agent, or Firm* — Morgan, Lewis & Bockius LLP

(57) ABSTRACT

Various touch surfaces can lead to the spread of many types of secondary infections. Although copper has some capacity for conveying antiseptic properties, it can be problematic to form a copper-containing surface upon an article that does not otherwise contain copper. Copper nanoparticles can be used to address this situation by forming a plurality of copper islands upon the substructure of an article. Articles having antiseptic properties can include an exposed surface coating containing a plurality of copper islands, and a substructure underlying the exposed surface coating, in which the substructure contains a material differing from copper. The copper nanoparticles can remain in their original form in the exposed surface coating, or at least a portion of the copper nanoparticles can be fused together to form the copper islands. Biocidal activity beyond limiting transfer of secondary infections can also be expressed in the articles.

10 Claims, 5 Drawing Sheets

(56) References Cited

U.S. PATENT DOCUMENTS

| | | |
|---|---|---|
| 7,736,414 B1 | 6/2010 | Zinn |
| 8,105,414 B2 | 1/2012 | Zinn |
| 8,192,866 B2 | 6/2012 | Golightly et al. |
| 8,486,305 B2 | 7/2013 | Zinn et al. |
| 8,834,747 B2 | 9/2014 | Zinn |
| 9,095,898 B2 | 8/2015 | Zinn |
| 2006/0286358 A1* | 12/2006 | Tower .......... H05K 1/0203 428/209 |
| 2012/0255166 A1* | 10/2012 | Kim .......... H05K 1/038 29/846 |
| 2012/0305306 A1* | 12/2012 | Zinn .......... C09D 11/322 174/268 |
| 2013/0171738 A1* | 7/2013 | Choi .......... G01N 27/3278 436/150 |
| 2013/0209692 A1 | 8/2013 | Zinn et al. |

OTHER PUBLICATIONS

M.J. Hajipour, et al., "Erratum: Antibacterial Properties of Nanoparticies," Trends in Biotechnology, 2013, vol. 31, pp. 61-62.

"Technical Report: The Application of Copper-Nickel Alloys in Marine Systems," 1992, pp. 7044-1919, Copper Development Association.

L. Sun, "The bacteria-fighting super element that's making a comeback in hospitals: copper," The Washington Post, published online Sep. 20, 2015. https://www.washingtonpost.com/national/health-science/the-bacteria-fighting-super-element-making-a-return-to-hospitals-copper/2015/09/20/19251704-5beb-11e5-8e9e-dce8a2a2a679_story.html.

L. Xiao-wang, et al., "Synthesis, characterization and antibacterial property of Ag/mesoporous CeO2 nanocomposite material," Trans. Nonferrous Met. Soc. China, 2012, 22, pp. 1418-1422.

"Study Proves Copper Kills the Superbug MRSA," published online Oct. 4, 2013, http://www.antimicrobialcopper.com/us/news-center/news/study-proves-copper-kills-the-superbug-mrsa.aspx.

"Disarming a silent killer: Copper surfaces take out superbugs," published online Apr. 23, 2013, http://academicdepartments.musc.edu/pr/newscenter/2013/copper.html#,UwafoxBmO3E.

Product Description, "Magical Socks Nanosilver with Silver Nanoparticles," published online http:/www.nanosilver.eu/Tema/Why-Nanosilver/Magical-Socks-Nanosilver-with-Silver-Nanoparticles.

C. Donskey, et al., "Privacy Curtains Can Harbor Super Bugs," Clickeze Privacy Systems.

* cited by examiner

ARTICLES HAVING AN EXPOSED SURFACE COATING FORMED FROM COPPER NANOPARTICLES

CROSS-REFERENCE TO RELATED APPLICATIONS

This application claims the benefit of priority under 35 U.S.C. § 119 from U.S. Provisional Patent Application 62/103,505, filed on Jan. 14, 2014 and incorporated herein by reference in its entirety.

STATEMENT REGARDING FEDERALLY SPONSORED RESEARCH OR DEVELOPMENT

Not applicable.

FIELD

The present disclosure generally relates to nanoparticles and, more specifically, to surfaces formed from nanoparticles and methods related thereto.

BACKGROUND

The world is facing increasing threats from antibiotic-resistant strains of bacteria (i.e., "super bugs") that cannot be effectively treated due, at least in part, to the overuse of antibiotics. Other types of resistant microorganisms can present similar issues. This represents a significant issue for human health, and growing concerns have been raised by organizations such as the Center for Infectious Disease (CID).

Secondary bacterial and fungal infections can represent a serious health concern in a variety of settings. As used herein, the term "secondary infection" will refer to an infection event that takes place during or following another infection or medical event, such as surgery or trauma. Whereas the immune system of a healthy individual might be able to ward off a chance encounter with a secondary infectious agent, it may be unable to do so when compromised due to another medical condition. The effects of secondary infections can be devastating, leading to increased hospitalization lengths and even death. This problem can be particularly serious when antibiotic-resistant strains of bacteria are involved.

In U.S. hospitals alone, approximately 200,000 persons die of infections every year. This represents a tremendous financial liability for both the medical and insurance industries. For example, infection costs are estimated to exceed eight billion dollars annually in the U.S. In hospital and other medical settings, secondary infections can spread readily via a variety of touch surfaces such as door knobs, appliances, pens, clip boards, desk tops, privacy curtains, medical gowns and other clothing. Improperly sterilized medical devices such as needles, catheters, implants, and the like can present similar problems. Another problematic source of infections can arise from bacteria residing latently on a patient's own skin during needle or surgical instrument penetration. Although cleansing routines can mitigate the transference of secondary infections to some degree, such protocols can be costly and time-consuming to implement and can be ineffective if not performed properly. Further, recent tests indicate that some cleansing routines, such as antiseptic wipe downs, can simply transfer harmful bacteria from one surface to another.

Secondary infections can also occur in a variety of other settings that can be just as deleterious as those encountered in a hospital or other medical setting. On the battlefield, soldiers endure extreme situations and less than sanitary conditions, which can lead to high rates of secondary infections that may claim more lives than combat wounds themselves, even in situations where the combat wound itself was not particularly serious. Secondary infections accompanying high velocity gunshots, shrapnel wounds, blunt trauma injuries, and burns, for example, can represent a significant concern for a fighting unit, both from strategic and cost standpoints. Not only are combat wounds often distinct from peacetime injuries, but the accompanying contamination arising from clothing, soil, and environmental debris can lead to a problematic rate of serious secondary infections. Many of these infections can arise through trauma-related entry of contaminated clothing into a wound. Biological warfare agents also represent an emerging infection concern.

In view of the foregoing, improved techniques for conveying antiseptic activity toward a variety of surfaces would be of considerable interest in the art. The present disclosure satisfies the foregoing need and provides related advantages as well.

SUMMARY

In various embodiments, the present disclosure describes articles including an exposed surface coating containing a plurality of copper islands, and a substructure underlying the exposed surface coating that includes a material differing from copper.

In other various embodiments, methods for conveying antiseptic activity to an article are described herein. The methods can include providing an article having a substructure containing a material differing from copper, and applying a plurality of copper nanoparticles to a surface of the article to form an exposed surface coating containing a plurality of copper islands.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
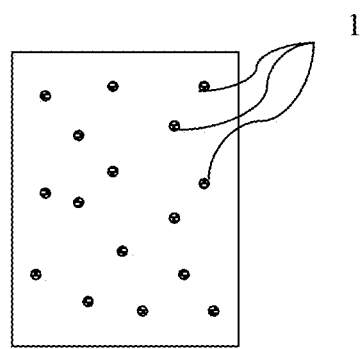
FIGS. 1-8 show illustrative schematics and images of surface coatings having copper in various morphological states.

The present disclosure is directed, in part, to articles having an exposed surface coating containing a plurality of copper islands. The present disclosure is also directed, in part, to methods for forming an exposed surface coating containing a plurality of copper islands upon various articles. The present disclosure is also directed, in part, to methods for passively mitigating the spread of microorganisms, including during secondary infection events, using an exposed surface coating containing a plurality of copper islands.

As discussed above, secondary infections can occur readily in a variety of settings, such as in a hospital or upon a battlefield, for example. Although cleansing routines can sometimes be utilized under controlled settings to mitigate the spread of adventitious microorganisms, the mitigation effects can often be incomplete and costly to implement. In uncontrolled settings, such as on a battlefield, effective decontamination to preclude the spread of microorganisms may be nearly impossible. Particularly for resistant bacteria, cleansing routines can often represent an inadequate solution for preventing the spread of infection. This situation can similarly be frequently encountered in the food service industry due to improper storage or poor cultivation practices, wherein adventitious bacteria are transferred to a foodstuff from a contaminated container, preparation instrument, and/or preparation surface and subsequently spread.

Unlike chemical-based decontamination approaches for mitigating the spread of bacteria and other microorganisms, some metals can provide an alternative approach for controlling their growth and viability. Silver has been widely used for this purpose. However, silver's excessive cost and relatively high toxicity can be prohibitive for controlling microorganisms, particularly in high-volume applications. Further, the types of surfaces to which silver can be effectively applied are often limited with conventional deposition techniques, which are addressed in more detail below. Copper can similarly provide antibacterial, antifungal, and/or antifouling activity in a variety of settings, and its properties in this regard can be at least partially orthogonal to those of silver in terms of the microorganisms affected. Indeed, copper has been used since ancient times within numerous realms due to its health-promoting effects and anti-fouling characteristics. Unlike silver, copper is an essential trace element for many biological entities, including humans. For example, copper metalloenzymes are known to regulate a wide variety of physiological processes including energy production, iron metabolism, connective tissue maturation, and neurotransmission. Although copper's cost and toxicity concerns are much lower than those of silver, the types of surfaces to which this metal can be effectively applied using conventional deposition techniques are often limited in much the same way as is silver. Thus, it has likewise not been conventional to incorporate copper into articles where it is not otherwise natively present. Similarly, complete replacement of other metals in an article with copper can be prohibitive due to cost concerns and the relatively malleable nature of this metal.

The exact mechanism by which copper, silver and other metals exert their antiseptic effects is not yet completely understood. Three non-limiting mechanistic possibilities have been widely proposed. A first non-limiting mechanism involves penetration of metal ions into a cell, wherein they can then disrupt DNA replication by blocking intracellular production of ATP. A second non-limiting mechanism involves accumulation of metal ions in the cell membrane and reduction of its permeability, thereby inhibiting transportation of protons and other materials necessary for cellular processes to occur and eventually leading to cellular death. A final non-limiting mechanism involves the activation of oxygen to form oxygen radicals which can cause rapid cellular degradation and death.

Conventional techniques for applying copper coatings and other metals to various surfaces include, for example, electroless deposition, electroplating, sputtering, chemical vapor deposition (CVD), and atomic layer deposition (ALD). However, these are all expensive and time-consuming processes that generally offer limited throughput capabilities. For example, only relatively small articles can be effectively coated due to engineering and cost limitations in the size of vacuum chambers used when employing deposition techniques requiring vacuum conditions. Further, there are often thermal constraints as to the materials to which these deposition techniques can be effectively applied. For example, many of these deposition techniques cannot generally be used to incorporate copper and other metals onto polymers and other thermally sensitive materials. Moreover, these deposition techniques cannot typically be employed to place a coating upon an article this is already operationally deployed in place. Finally, such deposition techniques can also provide limited control over the morphology and quantity of the deposited metal. Larger quantities of deposited metal can necessitate excessively long deposition times in many instances.

Metal nanoparticles can exhibit a number of properties that differ significantly from those of the corresponding bulk metal. As used herein, the term "metal nanoparticle" will refer to metal particles that are about 100 nm or less in size, without particular reference to the shape of the metal particles. One property of metal nanoparticles that can be of particular importance is nanoparticle fusion or consolidation that occurs at the metal nanoparticles' fusion temperature. As used herein, the term "fusion temperature" will refer to the temperature at which a metal nanoparticle liquefies, thereby giving the appearance of melting. As used herein, the terms "fusion" or "consolidation" will refer to the coalescence or partial coalescence of liquefied metal nanoparticles with one another to form a larger mass, such as a metal island. Upon decreasing in size, particularly below about 20 nm in equivalent spherical diameter, the temperature at which metal nanoparticles can be liquefied drops dramatically from that of the corresponding bulk metal. For example, copper nanoparticles having a size of about 20 nm or less can have fusion temperatures of about 220° C. or below, or about 200° C. or below, in comparison to bulk copper's melting point of 1083° C. Thus, the fusion of metal nanoparticles can allow metal working to take place at processing temperatures that are considerably lower than the melting point of the corresponding bulk metal. Moreover, the lower processing temperatures can advantageously allow metal nanoparticles to be used in combination with lower quality materials that are not particularly thermally stable.

The present inventor recognized that copper nanoparticles can be particularly effective toward forming articles having antiseptic activity. As used herein, the term "antiseptic" may be used synonymously with the term "biocidal," either of which will refer to a substance that is inhibitory toward one or more microorganisms such as, for example, bacteria, fungi, protozoa, and the like. Copper may be inhibitory toward various microorganisms by killing the microorganisms outright, or by stopping their reproduction and spread ex vivo or in vivo. Because of their advantageous processing capabilities and small size, copper nanoparticles can be readily infiltrated into, mixed with, and/or coated onto various articles during or after their manufacture in order to convey antiseptic properties thereto by becoming effectively bonded to the article. Simple deposition techniques such as spray-on, brush-on or dip coating, for example, can be used in this regard, particularly for "retrofitting" an existing article with an exposed surface coating of copper. None of these techniques have significant limitations in the size or composition of the article being coated. Copper nanoparticles can be particularly advantageous for forming an exposed surface coating upon articles having a substructure not otherwise containing copper. Not only does a surface coating provide optimal antiseptic effects by placing the copper in a location where it can most readily interact with microorganisms, but this approach also helps keep costs under control by allowing an exposed surface coating to be formed on less costly subsurface materials differing from copper, thereby lowering the amount of copper used to near the minimum effective level for providing antiseptic activity. Materials with which copper nanoparticles can be mixed and/or applied onto include, for example, metals, polymers, rubber, textile fibers, ceramics, wood, paper, and the like. In some embodiments, the article can be configured to achieve timed release of the copper. Therefore, utilizing copper nanoparticles for introducing copper to various articles in order to convey antiseptic properties thereto open a whole host of applications that would otherwise be infeasible with conventional metal deposition techniques. Both solvent dispersions and paste formulations containing copper nanoparticles be used in this regard.

Compared to silver, copper can provide tremendous competitive advantages. Silver is more toxic, more expensive, and highly supply-limited for large-scale commercial processing applications. Further, copper can target different microorganisms than does silver, including certain bacteria considered to be antibiotic-resistant and/or not well-controlled by silver, thereby providing an orthogonal activity profile. Although copper can be advantageous compared to silver, it is to be recognized that silver nanoparticles can also be used in combination with copper nanoparticles to provide independent advantages of both types of nanoparticles. Thus, utilizing silver nanoparticles and copper nanoparticles in combination with one another can broaden the range of microorganisms against which an article has antiseptic properties, thereby helping to mitigate the spread of infection. In addition to silver nanoparticles, copper nanoparticles can also be used in combination with rare earth metals, possibly in nanoparticle form, optionally in still further combination with silver nanoparticles, to provide an even more heightened profile of antiseptic activity. More particularly, rare earth metals that can readily access multiple oxidation states of near equal stability (e.g., the oxidation states of rare earth metals such as cerium, praseodymium, terbium, samarium, europium, and ytterbium) can enhance the antiseptic activity of copper and/or silver. Without being bound by any theory or mechanism, it is believed that the combination of a rare earth metal with copper and/or silver can activate oxygen to promote formation of oxygen radicals which can be toxic toward a variety of microorganisms. In particular, the higher oxidation state of the rare earth metal can be reduced by the copper or silver, generating an oxygen radical in the process, and re-oxidation of the rare earth metal by oxygen can then occur to complete a catalytic cycle. Transition metals that can readily access multiple oxidation states (e.g., vanadium (+4/+5), manganese (+3/+4), ruthenium (+2/+3), titanium (+3/+4) and the like) can also function similarly to a rare earth metal in this respect.

In addition to copper's favorable cost basis, robust antiseptic properties, and low human toxicity profile, copper nanoparticles can provide a number of additional advantages when used in conjunction with forming an antiseptic surface coating. Foremost, a surface coating formed from copper nanoparticles represents an entirely passive system for controlling the spread of microorganisms. That is, an article can be rendered antiseptic simply by virtue of the surface coating being present. Conventional cleansing routines, in contrast, inevitably miss some touch surfaces and/or transfer contamination, no matter how fastidiously performed, thereby raising the risk of spreading secondary infections. Further, an antiseptic surface coating can be particularly advantageous in locales where cleansing protocols are relatively infeasible, such as on the battlefield, for example.

In addition to their utility in fields where secondary infections are prevalent, surface coatings formed from copper nanoparticles can also provide similar benefits in other situations where microorganism contamination and spread is problematic. Illustrative instances where the presence of microorganisms can be problematic include, for example, food processing facilities, food storage containers, medical testing facilities, industrial equipment, lavatory surfaces, marine vessel hulls, exterior paint and surfaces, wooden fences and other surfaces, outdoor furniture, and the like. In the case of wooden surfaces, copper nanoparticles can constitute a replacement for arsenic-based anti-fouling compounds. A further side benefit, particularly in the military realm, is that the surface coating can display metallic conduction and have inherent EMI shielding capabilities as well.

Finally, because of the low fusion temperature of copper nanoparticles, surface coatings can be formed with the copper in various morphological states. In some embodiments, the copper can remain in nanoparticle form in the surface coatings as small copper nanoparticle "islands." Optionally, a plurality of the copper nanoparticles can be agglomerated into larger copper islands while still individually remaining in nanoparticle form. Copper islands containing agglomerated copper nanoparticles can be amorphous or crystalline in form, with agglomerates about about 35 nm in size tending to be more crystalline. Even when copper nanoparticles have not been processed above their fusion temperature to affect nanoparticle coalescence, robust copper adherence to the substructure of an article can still be realized, as discussed hereinbelow. Unfused copper nanoparticles can be more advantageous in the case of less thermally stable substructures such as polymers and textile fibers, for example. In other embodiments, the deposited copper nanoparticles can be heated above their fusion temperature and undergo coalescence into bulk copper islands within the surface coating. Fusion of copper nanoparticles can be particularly desirable for articles having a metallic substructure. In the case of an article having a metallic substructure, the bulk copper islands can be robustly bonded to the metallic substructure by metallic bonds. As used herein, the term "bulk copper" will refer to metallic copper having a melting point near the conventionally recognized melting point of 1083° C. Fused alloys of copper with other metals will also be considered to constitute bulk copper in the embodiments of the present disclosure.

In various embodiments, articles of the present disclosure can include an exposed surface coating containing a plurality of copper islands, and a substructure underlying the exposed surface coating, in which the substructure contains a material differing from copper. In some embodiments, the exposed surface coating can be present on the substructure of an article in which copper is not otherwise present. The exposed surface coating can convey antiseptic properties to the article against one or more types of microorganisms. As used herein, the term "exposed" will refer to the condition of the majority of the surface area of the surface coating being in direct contact with the environment external to the substructure of the article. Accordingly, the exposed surface coating can convey antiseptic properties to various articles that might otherwise constitute a touch source for spreading secondary infections.

Figure 2:
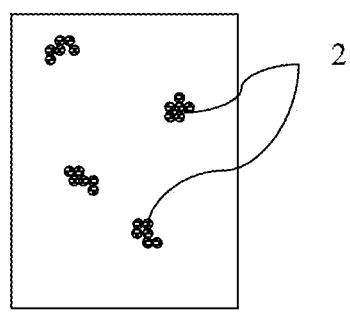
Figure 3:
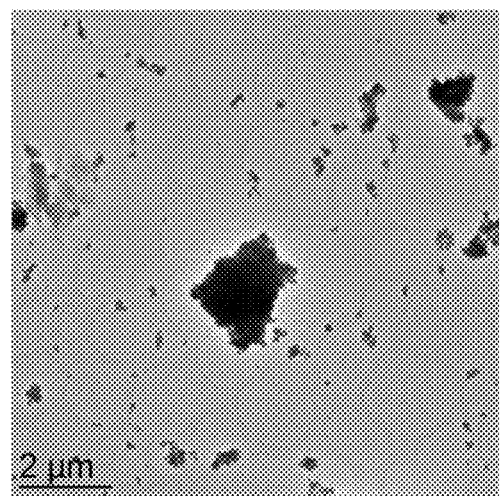
Figure 4:
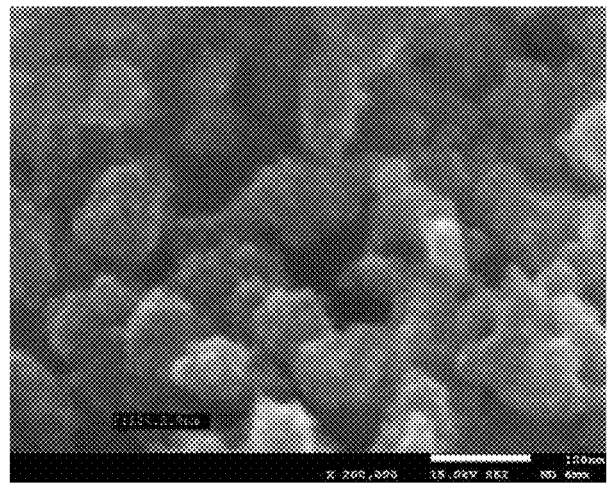
Figure 5:
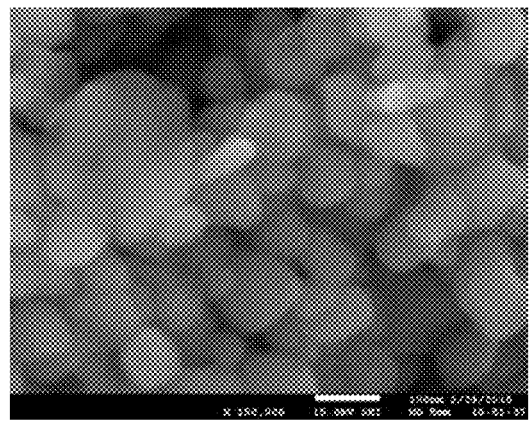

FIGS. 1-8 show illustrative schematics and images of surface coatings having copper in various morphological states. In some embodiments, the plurality of copper islands in the surface coating can be present in the form of unfused copper nanoparticles. As shown in FIG. 1, the copper nanoparticles 1 can be dispersed substantially as individuals in the surface coating in the form of small copper islands. Alternately, as shown in FIG. 2, a plurality of copper nanoparticles 2 can be agglomerated into larger copper islands, while the copper nanoparticles individually still remain present in nanoparticle form. FIG. 3 shows an illustrative TEM image of individual copper nanoparticles and agglomerated copper nanoparticles of various sizes distributed on a substrate surface. FIG. 4 shows an illustrative TEM image of agglomerated copper nanoparticles, wherein the individual nanoparticles are about 3-10 nm in size and the agglomerates are about 50-150 nm in size. As shown in FIG. 5, the copper nanoparticles can be in platelet form in some embodiments. Further disclosure directed to copper nanoparticles and their properties follows hereinbelow.

Figure 6:
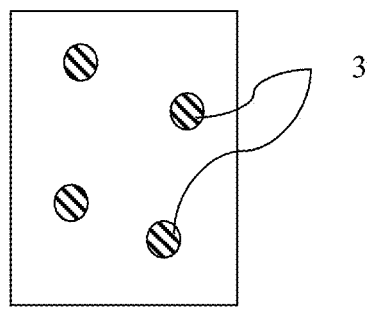
Figure 7:
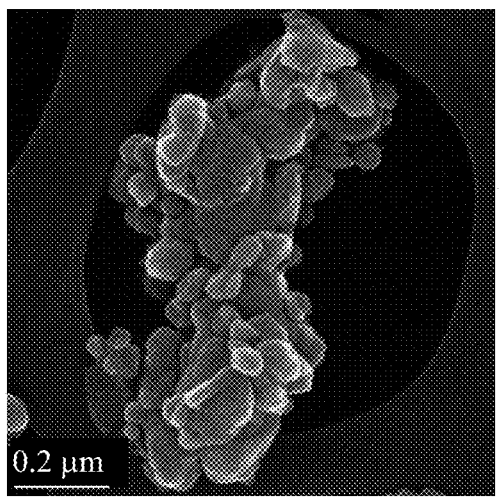
Figure 8:
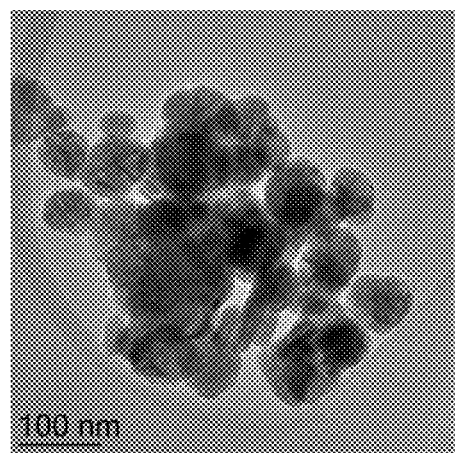

In some or other embodiments, the plurality of copper islands can be formed via fusion of copper nanoparticles into bulk copper. As shown in FIG. 6, copper islands 3 have lost their nanoparticle characteristics and are formed from bulk copper. For example, copper nanoparticles can be individually liquefied at their fusion temperature, and the liquefied copper metal can then undergo coalescence to form the copper islands. Alternately, an agglomerate of copper nanoparticles can be liquefied at the fusion temperature to form the copper islands. FIGS. 7 and 8 show illustrative TEM images of an agglomerate of copper nanoparticles in which nanoparticle fusion has taken place. In this case, the copper can be present in crystalline form. The agglomerate can also maintain a substantial degree of porosity and have a high surface area.

Depending on whether the copper nanoparticles are fused or unfused, the copper islands can vary over a wide range of sizes. When the copper nanoparticles are dispersed as individuals in the surface coating, the copper islands can mirror the size of the copper nanoparticles themselves. Illustrative size ranges for the copper nanoparticles are discussed hereinbelow. When the copper nanoparticles are agglomerated into larger copper islands or have undergone coalescence into bulk copper, the copper islands can range between about 25 nm and about 10 µm in size, or between about 50 nm and about 5 µm in size. In more particular embodiments, the copper islands can range between about 100 nm and about 1 µm in size, or between about 1 µm and about 5 µm in size, or between about 25 nm and about 250 nm in size, or between about 50 nm and about 250 nm in size. In some embodiments, the copper islands can contain platelets that are about 25 nm to about 250 nm wide and about 5 nm to about 25 nm thick.

In order for a surface coating to convey antiseptic properties to the substructure of an article, it is not necessary for the substructure to be entirely covered with copper. That is, a surface coating can still be antiseptic when the coating is discontinuous. In various embodiments, the surface coating can cover about 10% to about 90% of the surface area of the substructure of the article. In more particular embodiments, the surface coating can cover about 25% to about 75% of the surface area of the substructure of the article. In still more particular embodiments, the surface coating can cover about 30% to about 50% of the surface area of the substructure of the article.

To prevent surface movement, spreading and growth of microorganisms, the extent of coverage of the copper islands upon the underlying substructure of an article can be dictated, at least in part, by the size of the microorganisms against which the exposed surface coating is intended to convey antiseptic protection. That is, the greater the likelihood that a surface microorganism comes into contact with a copper island, the less likely the spread of the microorganism then becomes. For example, in the case of bacteria, the spacing between copper islands can be several microns in some embodiments, with about 0.2-2 micron or about 1-2 micron spacings representing typical ranges. In the case of viruses, which are much smaller, the spacing between copper islands can range between about 50-250 nm, with a 100-150 nm spacing representing a typical range. In the case of fungi, which are typically much larger, the spacing between the copper islands can be correspondingly larger.

The substructure upon which the surface coating is present can be formed from various materials or combinations thereof. In some embodiments, the substructure can comprise or consist of a metal differing from copper. Illustrative metals and metal alloys can include, for example, nickel, nickel alloys, brass, bronze, steel, and the like. In the case of a metal substructure, liquefying the copper nanoparticles at or above the fusion temperature can result in metallic bonding of bulk copper within the metal islands to the metal substructure. Incomplete fusion can be desirable in many instances to maintain porosity within the copper islands. In some or other embodiments, the substructure can comprise or consist of textile fibers, a polymer, wood, or a ceramic. The identities of these materials are not considered to be particularly limited, especially if the copper nanoparticles are allowed to remain in their unfused form. In situations where the copper nanoparticles are heated at or above the fusion temperature to form bulk copper, a substructure material that is thermally stable at least up to the fusion temperature can be desirable.

In some embodiments, the copper islands can retain a degree of porosity ranging between about 10% and about 50%. In more specific embodiments, the copper islands can be about 20% to about 40% porous. Larger porosity values result in increased surface areas of the copper islands and can result in more effective contact for promoting biocidal activity.

The copper islands in the surface coating can be chemically bonded to the substructure of the article, or they can be physically adsorbed or bonded thereto. For example, in some embodiments, a surface coating containing copper islands in the form of copper nanoparticles can be dispersed in a matrix material that is disposed upon the article's substructure, where the matrix material itself provides for the adherence of the copper nanoparticles to the article. Specifically, in some embodiments, the copper nanoparticles or agglomerates thereof can be at least partially embedded within the matrix material in order to affect adherence to the article. The partially embedded copper nanoparticles or agglomerates can still maintain an exposed surface coating. A variety of matrix materials can be suitable in this regard, such as conventional fiber sizing materials, polymers (e.g., polyamides, polyesters, and like thermoplastic materials), rubber and similar elastomers, adhesives, and the like. In some or other embodiments in which the copper nanoparticles remain in nanoparticle form, chemical bonding to the underlying substructure can take place via one or more reactive functional groups surrounding a copper core of the copper nanoparticles. For example, amine and carboxylic acid groups within a surface layer surrounding the copper nanoparticles can affect chemical bonding to the underlying substructure. In the case of chemically bonded copper nanoparticles, the copper nanoparticles or their agglomerates need not necessarily be embedded or partially embedded within a matrix material of the exposed surface coating in order to maintain adherence. In embodiments in which the copper nanoparticles undergo coalescence to form copper islands containing bulk copper, the copper can be chemically bonded to an underlying metallic substructure via metallic bonding. In the case of metal substructures having a surface oxide present, chemical bonding of the copper nanoparticles can take place by way of the surface oxide. Ceramic materials having reactive oxygen functionalities on their surface can also behave similarly when coated with copper.

In some embodiments, the copper nanoparticles or an agglomerate thereof can be incorporated within a matrix material during manufacturing of an article. For example, by mixing copper nanoparticles within a polymer matrix and then producing fibers from the mixture (e.g., by extrusion or spinning), at least partially embedded copper nanoparticles or their agglomerates can be produced at the surface of the fibers. The copper nanoparticles embedded at the surface of the matrix material can still maintain an exposed surface for promoting antiseptic activity. A surfactant coating upon the copper nanoparticles can help promote dispersion within the matrix material. Spray-on techniques during fiber manufacturing can similarly promote partial embedding of the copper nanoparticles into the matrix material of the fibers.

In the case of covalent bonding of the copper nanoparticles or their agglomerates, there exists a wide variety of ways in which covalent bonding can be carried out. In the case of cellulosic fibers such as cotton fibers, for example, the cellulosic alcohol groups can be acylated with a carbonyl compound such as succinic anhydride, and the remaining carboxylic acid group can then bond to the surface of the copper nanoparticles. That is, the succinic anhydride moiety can establish a bridge between the underlying substructure and the copper nanoparticles. In other embodiments, the remaining carboxylic acid group can be subsequently acylated by another amine or alcohol moiety (e.g., a diamine, a diol, or an amino alcohol) to establish a longer bridge between the copper nanoparticles and the underlying substructure of the article. Illustrative coupling techniques can include, for example, carbodiimide coupling, the Mitsunobu reaction, or the Steglich reaction. Still another option is to convert some of the cellulosic alcohol groups into amines and then bond the amine groups directly to the copper nanoparticles.

In addition to the copper islands, the exposed surface coating can further include silver, a rare earth metal, or any combination thereof. Inclusion of any of these metals can further enhance the antiseptic properties of the surface coating. In some embodiments, the exposed surface coating can include the copper islands and silver. In other embodiments, the exposed surface coating can include the copper islands and a rare earth metal. In still other embodiments, the exposed surface coating can include the copper islands, silver, and a rare earth metal. In illustrative embodiments, a particularly suitable rare earth metal that can be included in the surface coating is cerium due to its readily accessible oxidation states of comparable stability. Other particularly suitable rare earth metals in this regard can include, for example, praseodymium, terbium, samarium, and europium. In some embodiments the rare earth metal or a similarly functioning transition metal can be contained within a perovskite compound. In further embodiments, the perovskite compound can be coated upon a substructure, upon which the copper and/or silver nanoparticles are subsequently deposited. In some or other embodiments, a perovskite particle, which can be a perovskite nanoparticle in certain configurations, can be coated with silver and/or copper to form a core-shell nanoparticle which can be subsequently deposited on a substructure and undergo adherence thereto. In illustrative embodiments, the relative weight percentages of the foregoing components can be above 0 to about 80% perovskite, about 20 to about 80% copper, and 0 to about 5 percent silver. When present, the silver can be disposed within the surface coating in the form of nanoparticles, and the nanoparticles can remain fused or unfused, just like the copper nanoparticles forming the copper islands. Should fusion occur, the silver and/or rare earth metals can become alloyed with the copper in the copper islands. In the case of the rare earth metal being present in the form of a perovskite, it is believed that the rare earth metal does not become alloyed. In some embodiments, particles of the rare earth metal can be significantly larger than the copper nanoparticles, such as up to about 10 microns in size and/or with a size ratio that is greater than about 5 times that of the copper nanoparticles. In alternative embodiments, the rare earth metal can be present in the form of rare earth metal nanoparticles or a compound thereof.

A number of scalable processes for producing bulk quantities of metal nanoparticles, such as copper nanoparticles, in a targeted size range have been developed, several of which are further described hereinbelow. Such processes typically involve reducing a metal precursor in the presence of a surfactant, followed by isolation of the metal nanoparticles from the reaction mixture. The metal nanoparticles can have a surfactant coating on their exterior surface, which can further tailor the properties of the metal nanoparticles. Such metal nanoparticles can be further dispersed in a solvent for improved workability and dispensation, or formulated into a paste. Exemplary compositions are described hereinbelow.

Particularly facile metal nanoparticle fabrication techniques are described in commonly owned U.S. Pat. Nos. 7,736,414, 8,105,414, 8,192,866, 8,486,305, 8,834,747, and 9,095,898; and commonly owned United States Patent Application Publication 2013/0209692, each of which is incorporated herein by reference in its entirety. As described therein, metal nanoparticles can be fabricated in a narrow size range by reduction of a metal salt in a solvent in the presence of a suitable surfactant system. Further description of suitable surfactant systems follows below. In the presence of a suitable surfactant system, metal nanoparticles having a size range between about 1 nm and about 50 nm and including a surfactant coating thereon can be produced. In more particular embodiments, metal nanoparticles having a surfactant coating and a size range between about 1 nm and about 20 nm, or between about 1 nm and about 10 nm, or between about 1 nm and about 7 nm, or between about 1 nm and about 5 nm can be produced.

Suitable organic solvents for solubilizing metal salts and forming metal nanoparticles can include aprotic solvents such as, for example, formamide, N,N-dimethylformamide, dimethyl sulfoxide, dimethylpropylene urea, hexamethylphosphoramide, tetrahydrofuran, glyme, diglyme, triglyme, tetraglyme, and the like. Reducing agents suitable for reducing metal salts and promoting the formation of metal nanoparticles can include, for example, an alkali metal in the presence of a suitable catalyst (e.g., lithium naphthalide, sodium naphthalide, or potassium naphthalide) or borohydride reducing agents (e.g., sodium borohydride, lithium borohydride, potassium borohydride, or a tetraalkylammonium borohydride).

Figure 9:
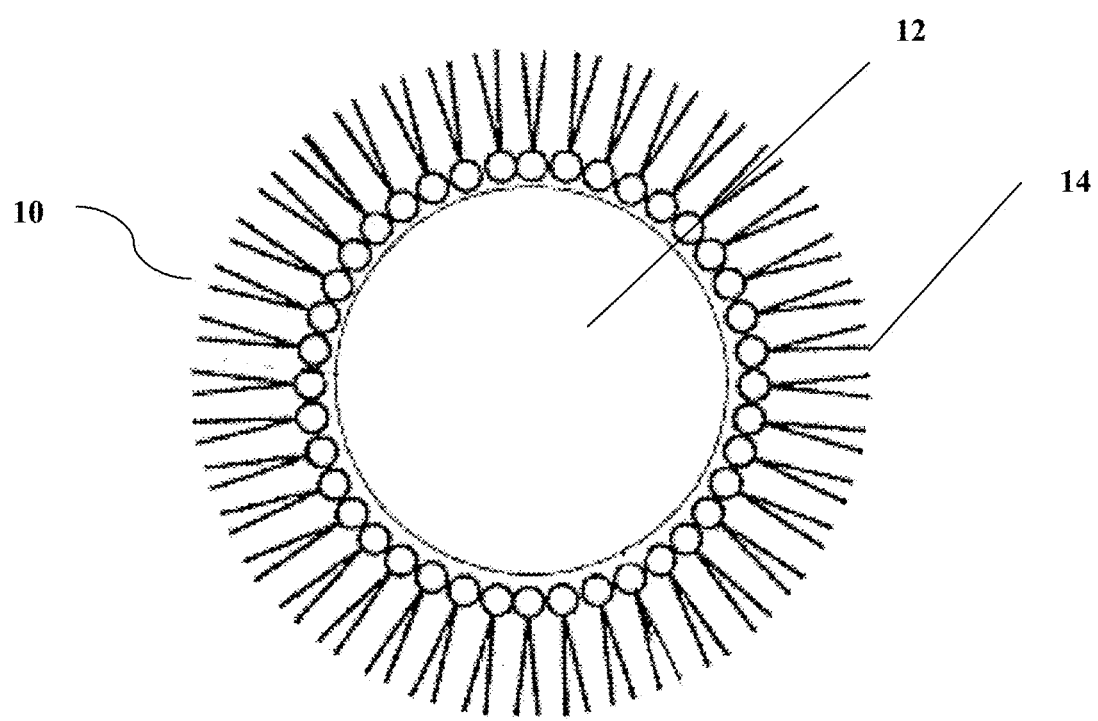
FIGS. 9 and 10 show presumed structures of illustrative metal nanoparticles having a surfactant coating thereon.
Figure 10:
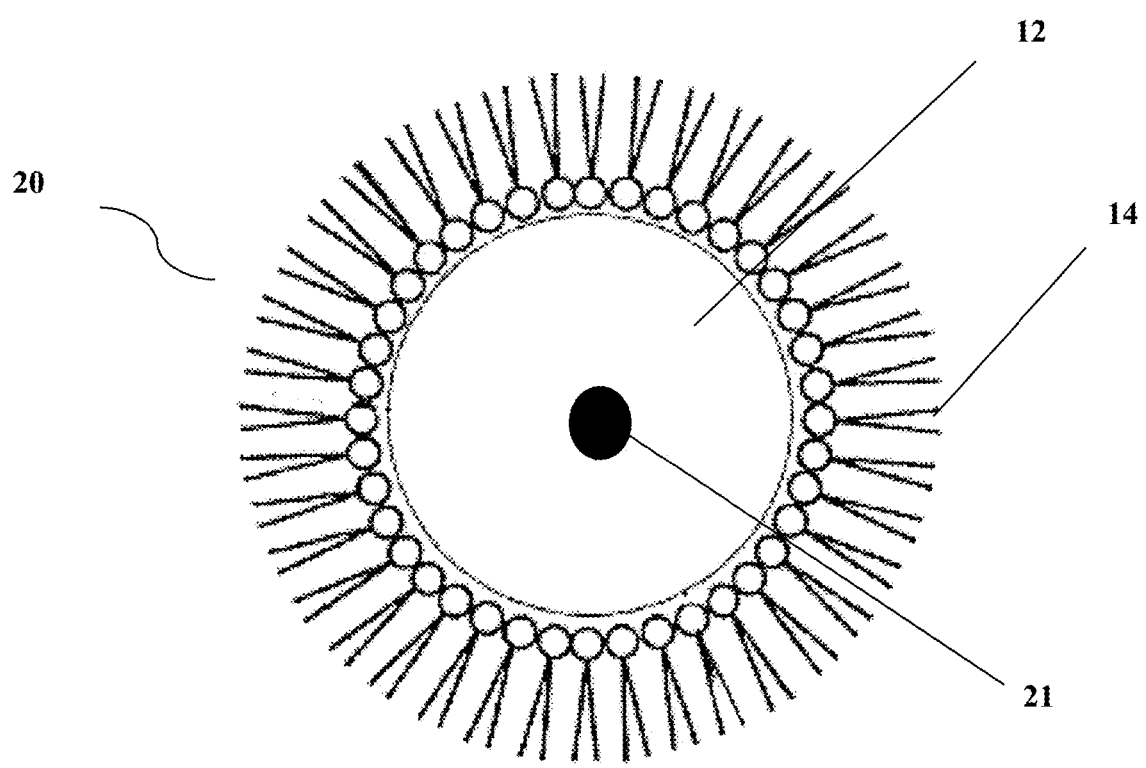

Without being bound by any theory or mechanism, FIGS. 9 and 10 show presumed structures of illustrative metal nanoparticles having a surfactant coating thereon. As shown in FIG. 9, metal nanoparticle 10 includes metallic core 12 and surfactant layer 14 overcoating metallic core 12. Surfactant layer 14 can contain any combination of surfactants, as described in more detail below. Metal nanoparticle 20 shown in FIG. 10 is similar to that depicted in FIG. 9, but metallic core 12 is grown about nucleus 21, which can be a metal that is the same as or different than that of metallic core 12. Because nucleus 21 is buried deep within metallic core 12 in metal nanoparticle 20, it is not believed to significantly affect the overall nanoparticle properties.

In various embodiments, the surfactant coating upon the metal nanoparticles contains one or more surfactants. The surfactant coating can be formed on the metal nanoparticles during their synthesis. Formation of a surfactant coating on the metal nanoparticles during their synthesis can desirably tailor the ability of the metal nanoparticles to fuse to one another, limit their agglomeration with one another, and promote the formation of a population of metal nanoparticles having a narrow size distribution.

In various embodiments, the surfactant system used to prepare the metal nanoparticles can include one or more surfactants. The differing properties of various surfactants can be used to tailor the properties of the metal nanoparticles, such as their size and reactivity. Factors that can be taken into account when selecting a surfactant or combination of surfactants for use in synthesizing metal nanoparticles can include, for example, ease of surfactant dissipation from the metal nanoparticles during nanoparticle fusion, nucleation and growth rates of the metal nanoparticles, affinity of the surfactants with the chosen metal, and the like.

In some embodiments, an amine surfactant or combination of amine surfactants, particularly aliphatic amines, can be used during the synthesis of metal nanoparticles. Amine surfactants, in particular, can have a high affinity for bonding to copper nanoparticles. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. This surfactant system can be particularly efficacious for forming copper nanoparticles having a narrow size range distribution. Further disclosure regarding suitable amine surfactants follows hereinafter.

In some embodiments, the surfactant system can include a primary alkylamine. In some embodiments, the primary alkylamine can be a $C_2$-$C_{18}$ alkylamine. In some embodiments, the primary alkylamine can be a $C_7$-$C_{10}$ alkylamine. In other embodiments, a $C_5$-$C_6$ primary alkylamine can also be used. Without being bound by any theory or mechanism, the exact size of the primary alkylamine can be balanced between being long enough to provide an effective inverse micelle structure versus having ready volatility and/or ease of handling. For example, primary alkylamines with more than 18 carbons can also be suitable for use in the present embodiments, but they can be more difficult to handle because of their waxy character. $C_7$-$C_{10}$ primary alkylamines, in particular, can represent a good balance of desired properties for ease of use.

In some embodiments, the $C_2$-$C_{18}$ primary alkylamine can be n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used in some embodiments. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the metal coordination sphere but can be readily dissociable during metal nanoparticle fusion.

In some embodiments, the surfactant system can include a secondary amine. Secondary amines suitable for forming metal nanoparticles can include normal, branched, or cyclic $C_4$-$C_{12}$ alkyl groups bound to the amine nitrogen atom. In some embodiments, the branching can occur on a carbon atom bound to the amine nitrogen atom, thereby producing significant steric encumbrance at the nitrogen atom. Suitable secondary amines can include, without limitation, dihexylamine, diisobutylamine, di-t-butylamine, dineopentylamine, di-t-pentylamine, dicyclopentylamine, dicyclohexylamine, and the like. Secondary amines outside the $C_4$-$C_{12}$ range can also be used, but such secondary amines can have undesirable physical properties such as low boiling points or waxy consistencies that can complicate their handling.

In some embodiments, the surfactant system can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present. In some embodiments, the alkyl groups can be $C_1$-$C_6$ alkyl groups. In other embodiments, the alkyl groups can be $C_1$-$C_4$ alkyl groups or $C_3$-$C_6$ alkyl groups. In some embodiments, $C_3$ or higher alkyl groups can be straight or have branched chains. In some embodiments, $C_3$ or higher alkyl groups can be cyclic. Without being bound by theory or mechanism, it is believed that diamine chelating agents can facilitate metal nanoparticle formation by promoting nanoparticle nucleation.

In some embodiments, suitable diamine chelating agents can include N,N'-dialkylethylenediamines, particularly $C_1$-$C_4$ N,N'-dialkylethylenediamines. The corresponding methylenediamine, propylenediamine, butylenediamine, pentylenediamine or hexylenediamine derivatives can also be used. The alkyl groups can be the same or different. $C_1$-$C_4$ alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for use in forming metal nanoparticles include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly $C_1$-$C_4$N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in forming metal nanoparticles include, for example, N,N,N',N'-tetramethylethylenediamine, N,N,N',N'-tetraethylethylenediamine, and the like.

Surfactants other than aliphatic amines can also be present in the surfactant system. In this regard, suitable surfactants can include, for example, pyridines, aromatic amines, phosphines, thiols, or any combination thereof. These surfactants can be used in combination with an aliphatic amine, including those described above, or they can be used in a surfactant system in which an aliphatic amine is not present. Further disclosure regarding suitable pyridines, aromatic amines, phosphines, and thiols follows below.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in forming metal nanoparticles include, for example, aniline, toluidine, anisidine, N,N-dimethylaniline, N,N-diethylaniline, and the like. Other aromatic amines that can be used in conjunction with forming metal nanoparticles can be envisioned by one having ordinary skill in the art.

Suitable pyridines can include both pyridine and its derivatives. Illustrative pyridines that can be suitable for use in forming metal nanoparticles include, for example, pyridine, 2-methylpyridine, 2,6-dimethylpyridine, collidine, pyridazine, and the like. Chelating pyridines such as bipyridyl chelating agents can also be used. Other pyridines that can be used in conjunction with forming metal nanoparticles can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be used in forming metal nanoparticles include, for example, trimethylphosphine, triethylphosphine, tributylphophine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with forming metal nanoparticles can be envisioned by one having ordinary skill in the art Suitable thiols can have a formula of RSH, where R is an alkyl or aryl group having from about 4 to about 16 carbon atoms. Illustrative thiols that can be used for forming metal nanoparticles include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with forming metal nanoparticles can be envisioned by one having ordinary skill in the art.

For application to the substructure of an article, the metal nanoparticles can be dispersed in an organic matrix containing one or more organic solvents. In some embodiments, at least some of the one or more organic solvents can have a boiling point of about 100° C. or greater. In some embodiments, at least some of the one or more organic solvents can have a boiling point of about 200° C. or greater. In some embodiments, the one or more organic solvents can have boiling points ranging between about 50° C. and about 200° C. Use of high boiling organic solvents can desirably increase the pot life. In some embodiments, at least some of the one or more organic solvents can have a boiling point that is higher than those of the surfactants associated with the metal nanoparticles. Accordingly, in such embodiments, the surfactant(s) can be removed from the metal nanoparticles by evaporation before removal of the organic solvent(s) takes place.

In some embodiments, an organic matrix containing one or more hydrocarbons, one or more alcohols, one or more amines, and one or more organic acids can be especially desirable. Without being bound by any theory or mechanism, it is believed that this combination of organic solvents can facilitate the removal and sequestration of surfactant molecules surrounding the metal nanoparticles, such that the metal nanoparticles can more easily fuse together with one another. More particularly, it is believed that hydrocarbon and alcohol solvents can passively solubilize surfactant molecules released from the metal nanoparticles by Brownian motion and reduce their ability to become re-attached thereto. In concert with the passive solubilization of surfactant molecules, amine and organic acid solvents can actively sequester the surfactant molecules through a chemical interaction such that they are no longer available for recombination with the metal nanoparticles.

In some embodiments, more than one member of each class of organic solvent (i.e., hydrocarbons, alcohols, amines, and organic acids), can be present in the organic matrix, where the members of each class have boiling points that are separated from one another by a set degree. For example, in some embodiments, the various members of each class can have boiling points that are separated from one another by about 20° C. to about 50° C. By using such a solvent mixture, sudden volume changes due to rapid loss of solvent can be minimized during metal nanoparticle consolidation, since the various components of the solvent mixture can be removed gradually over a broad range of boiling points (e.g., about 50° C. to about 200° C.).

In some embodiments, the organic matrix can contain one or more alcohols. In various embodiments, the alcohols can include monohydric alcohols, diols, triols, glycol ethers (e.g., diethylene glycol and triethylene glycol), alkanolamines (e.g., ethanolamine, triethanolamine, and the like), or any combination thereof. In some embodiments, one or more hydrocarbons can be present in combination with one or more alcohols. As discussed above, it is believed that alcohol and hydrocarbon solvents can passively promote the solubilization of surfactants as they are removed from the metal nanoparticles by Brownian motion and limit their re-association with the metal nanoparticles. Moreover, hydrocarbon and alcohol solvents only weakly coordinate with metal nanoparticles, so they do not simply replace the displaced surfactants in the nanoparticle coordination sphere. Illustrative but non-limiting examples of alcohol and hydrocarbon solvents that can be present in the nanoparticle compositions include, for example, light aromatic petroleum distillate (CAS 64742-95-6), hydrotreated light petroleum distillates (CAS 64742-47-8), tripropyleneglycol methyl ether, ligroin (CAS 68551-17-7, a mixture of $C_{10}$-$C_{13}$ alkanes), diisopropyleneglycol monomethyl ether, diethyleneglycol monomethyl ether, diethyleneglycol diethyl ether, 2-propanol, 2-butanol, t-butanol, 1-hexanol, 2-(2-butoxyethoxy)ethanol, and terpineol. In some embodiments, polyketone solvents can be used in a like manner.

In some embodiments, the organic matrix can contain one or more amines and one or more organic acids. In some embodiments, the one or more amines and one or more organic acids can be present in an organic matrix that also includes one or more hydrocarbons and one or more alcohols. As discussed above, it is believed that amines and organic acids can actively sequester surfactants that have been passively solubilized by hydrocarbon and alcohol solvents, thereby making the surfactants unavailable for re-association with the metal nanoparticles. Thus, an organic solvent that contains a combination of one or more hydrocarbons, one or more alcohols, one or more amines, and one or more organic acids can provide synergistic benefits for promoting the consolidation of metal nanoparticles. Illustrative but non-limiting examples of amine solvents that can be present in the organic matrix include, for example, tallowamine (CAS 61790-33-8), alkyl ($C_8$-$C_{18}$) unsaturated amines (CAS 68037-94-5), di(hydrogenated tallow)amine (CAS 61789-79-5), dialkyl ($C_8$-$C_{20}$) amines (CAS 68526-63-6), alkyl ($C_{10}$-$C_{16}$)dimethyl amine (CAS 67700-98-5), alkyl ($C_{14}$-$C_{18}$) dimethyl amine (CAS 68037-93-4), dihydrogenated tallowmethyl amine (CAS 61788-63-4), and trialkyl ($C_6$-$C_{12}$) amines (CAS 68038-01-7). Illustrative but non-limiting examples of organic acid solvents that can be present in the organic matrix include, for example, octanoic acid, nonanoic acid, decanoic acid, caprylic acid, pelargonic acid, undecylic acid, lauric acid, tridecylic acid, myristic acid, pentadecanoic acid, palmitic acid, margaric acid, stearic acid, nonadecylic acid, α-linolenic acid, stearidonic acid, oleic acid, and linoleic acid.

Accordingly, methods for forming an article having an exposed surface coating containing copper islands can include providing an article having a substructure with a material differing from copper, and applying a plurality of copper nanoparticles to a surface of the article to form an exposed surface coating containing a plurality of copper islands. As discussed above, the copper islands can be formed individually or collectively from copper nanoparticles themselves, or they can be formed from bulk copper after heating the copper nanoparticles above the fusion temperature. Therefore, in some embodiments, the methods of the present disclosure can further include fusing at least a portion of the plurality of copper nanoparticles together to form the plurality of copper islands.

The plurality of copper nanoparticles can be applied to the surface of the substructure of the article at any point during the article's manufacture. In some embodiments, the plurality of copper nanoparticles can be applied to the substructure to form the exposed surface coating after the article is manufactured. That is, the exposed surface coating can formed upon an existing article that is not otherwise especially antiseptic or biocidal. In other various embodiments, the plurality of copper nanoparticles can be applied to the substructure to form the exposed surface coating while the article is being manufactured. In some embodiments, the copper nanoparticles or an agglomerate thereof can become at least partially embedded in the substructure of the article. Illustrative techniques for applying the plurality of copper nanoparticles to the surface of the substructure can include, for example, spray coating, dip coating, roller coating, stenciling, ink jet printing, painting, spreading, and the like.

In alternative embodiments, the copper nanoparticles can be admixed with a matrix constituting the substructure of an article during its manufacture. Accordingly, in such embodiments, the copper nanoparticles can be dispersed throughout the substructure of the article, including forming a surface coating thereon. Surface coatings formed on an article in this way can likewise confer antiseptic properties to the article in a manner similar to that described above.

In further embodiments, methods of the present disclosure can include applying a plurality of silver nanoparticles to the surface of the article along with the copper nanoparticles. In some or other further embodiments, methods of the present disclosure can include applying a rare earth metal to the surface of the article along with the copper nanoparticles. In still other further embodiments, methods of the present disclosure can include applying a rare earth metal nanoparticle to the surface of the article along with the copper nanoparticles and silver nanoparticles. In either case, the rare earth metal can be present in the form of rare earth nanoparticles, or in larger particle sizes up to about 10 microns. As indicated above, including either of these types of nanoparticles in an exposed surface coating can convey enhanced antiseptic activity to an article. In some embodiments, the rare earth metal or similarly functioning transition metal can be present in the form of a perovskite compound or similar ceramic oxide carrier.

The types of articles on which a surface coating of the present disclosure can be formed are not considered to be particularly limited. Illustrative articles on which a surface coating containing copper islands can be present include, for example, textile fibers, instruments, equipment, appliances, materials systems, garments, storage containers, exterior surfaces, and the like. Illustrative examples of medical equipment on which a surface coating can be formed include, for example, needles, catheters, stents, surgical gloves, gowns, bedding, wound dressings, bandages, scalpels, surgical tubing, medical surfaces, privacy curtains, implants, antiseptic wipes, endoscopes, sutures, and building walls. In the military realm, illustrative articles on which a surface coating can be formed include, for example, uniforms, camouflage netting, and tents. Other types of articles on which an antiseptic surface coating can be formed include, for example, contact lenses, dental floss, food storage containers, food dispensing equipment, food preparation surfaces (e.g., in restaurants and food processing plants), marine vessel hulls, tubing, piping and pipelines, wood-based articles, and paper-based articles.

Medical devices and equipment prepared according to the disclosure herein can be self-sterilizing or enhance complementary sterilization techniques. In war zones and other non-sanitary locales, the articles described herein can improve sanitary conditions of needles, surgical tools, surgical and first aid dressings, surgical tables, patient beds and the like. Protection against antibiotic-resistant bacteria (i.e., "super-bugs") can be provided in some instances.

In the garment realm, clothing formed from a textile having a surface coating of the present disclosure can have long-lasting microbial and fungal resistance. This can decrease the amount of odor emitted upon extended wearing of the clothing. In military applications, clothing formed from a copper-impregnated textile can be less susceptible to fouling in battlefield conditions, in which the clothing may be worn for extended periods of time and become contamination with microorganisms. In addition, when used in camouflage netting, the presence of the copper metal can further suppress the ability of an enemy to conduct electronic eavesdropping due to the EMI shielding effect.

Food safety can also be improved by utilizing the articles described herein. Namely, a surface coating upon a food service article can suppress the buildup and transfer of harmful bacteria and other pathogens. This benefit can be realized throughout the food supply chain, from manufacturing to distribution and preparation of food at home or in a restaurant. For example, food packaging, food preparation surfaces and equipment, cookware, utensils, dishwashing equipment and the like can take advantage of the biocidal properties of copper with a surface coating. Stainless steel materials enhanced with a surface coating of copper islands, for example, can continue to take advantage of the thermal properties and low cost of stainless steel relative to copper while still exhibiting antiseptic properties.

Copper can also be incorporated in gas masks and air filters (e.g., building, airplane cabin, and auto air filters) in a similar manner to that described above. This can protect an occupant or wearer from exposure to a biological agent. This aspect of the present disclosure can be useful in providing protection during conventional disease outbreaks. Anti-terrorism applications are also within the scope of the present disclosure in this regard. When incorporated within a filter, the copper nanoparticles can be loaded onto activated charcoal powder or another suitable carrier and undergo bonding thereto as described herein.

As indicated above, antiseptic properties can be conveyed to an article by coating and/or mixing copper nanoparticles with an existing article during or after its manufacture. Due to the small size of copper nanoparticles, incorporating them during an article's manufacturing process does not typically involve significant changes to existing manufacturing protocols. In illustrative embodiments, methods for manufacturing an article can include, for example, impregnating copper nanoparticles within a matrix defining the substructure of an article, such that copper islands are exposed at the article's surface. In other illustrative embodiments, methods for manufacturing an article can include applying copper nanoparticles as a surface coating to an existing article by spray-on, paint-on, brush-on, or ink jet printing technique using a suitably formulated paint or ink containing copper nanoparticles. In illustrative embodiments, copper nanoparticles can be impregnated into a fabric, and in further embodiments, a moderate thermal treatment can be applied to liquefy the copper nanoparticles and result in the bonding of copper islands to the fabric. Alternately, copper nanoparticles can be incorporated within a sizing or similar coating disposed about individual fibers, wherein the copper nanoparticles are adhered to the fibers via the sizing.

Related techniques can also be used during an article's manufacture. For example, copper nanoparticles can be mixed with polymers that will be spun into textile fibers and then woven into textile fabrics. In this case, the copper islands are dispersed throughout the textile fibers and on its surface. Similar techniques can also be used to prepare non-fibrous articles from a mixture of polymer and copper nanoparticles. Likewise, copper nanoparticles can be combined with a molten or softened metal that is being formed into an article. Dispersal of copper throughout the in-process article can occur.

Although the disclosure has been described with reference to the above embodiments, one of ordinary skill in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. An article comprising:
    an exposed surface coating comprising a plurality of copper islands; and
    a substructure underlying the exposed surface coating, the substructure comprising a material differing from copper,
    wherein the plurality of copper islands are chemically bonded to the substructure, and
    wherein the plurality of copper islands comprise a plurality of unfused copper nanoparticles.

2. The article of claim 1, wherein the exposed surface coating covers about 30% to about 50% of a surface area of the substructure.

3. The article of claim 1, wherein the exposed surface coating further comprises silver.

4. The article of claim 1, wherein the exposed surface coating further comprises a rare earth metal.

5. The article of claim 1, wherein the substructure comprises a metal differing from copper.

6. The article of claim 1, wherein the substructure comprises textile fibers.

7. The article of claim 1, wherein the substructure comprises a polymer.

8. The article of claim 1, wherein the substructure comprises a ceramic.

9. The article of claim 1, wherein the exposed surface coating conveys antiseptic properties to the article.

10. The article of claim 1, wherein the plurality of copper islands range between about 25 nm and about 10 μm in size.

* * * * *